Patented July 28, 1925.

1,547,187

UNITED STATES PATENT OFFICE.

JOHN MORRIS WEISS, OF NEW YORK, N. Y.

REMOVAL OF COLOR FROM PLASTIC MATERIALS.

No Drawing.     Application filed January 2, 1924. Serial No. 684,088.

*To all whom it may concern:*

Be it known that I, JOHN MORRIS WEISS, a citizen of the United States, and residing in the city and county of New York and State of New York, have invented certain new and useful Improvements in the Removal of Color from Plastic Materials, of which the following is a specification.

This invention relates to the removal of color from plastic materials, especially those plastics which have been artificially colored by a soluble dyestuff. Although the invention will be described in its application to celluloid and the like, it is not my intention to be limited to this material but intend to include numerous other plastics on which the process may be carried on in identical fashion, some of which are later specifically mentioned.

Plastics come into trade in various forms, many of which are colored by soluble dyestuffs to give various pleasing or artistic results or to imitate the appearance of certain natural articles. Thus, celluloid comes on the market in sheets of various grades and colors, some clear, some clear amber color and quite a variety of mixed colors of which one of the commonest is imitation tortoise shell. In the manufacture of articles such as imitation tortoise shell eye-glass frames, which are cut from solid strips of celluloid, the scrap cuttings may amount to over 80% of the raw materials used. This scrap can be formed again into sheets by softening with a suitable solvent such as acetone, ethyl acetate, etc., milling, pressing and, in general, proceeding as in the original manufacture of the sheeted product. The scrap, however, contains dyes to color it and as in the case of eye-glass frames, to give them a tortoise shell effect. These dyes are not altered materially in the above treatment and the recovered scrap is therefore only useful for production of black or very dark articles. Attempts have been made to employ mineral bleaching agents such as chlorine but these have proved impractical because of injury to the nitrocellulose or camphor constitutents of the celluloid itself, producing a composition inferior to that manufactured directly from the raw materials.

I have found that if peroxides of organic acids such as benzoyl peroxide, phthalyl peroxide, fumaryl peroxide, phthalic acid peroxide, etc., are used as a bleaching agent in the recovery process, that the bulk of the color is removed without damage to the celluloid substance and the resulting product can again be used for the production of light colored, transparent material or by the suitable addition of colored material, for the production of imitation tortoise shell stock.

Without limiting myself thereby I state that the formulæ of the compounds referred to has been considered to be as follows:

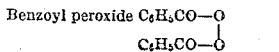
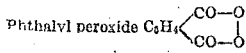
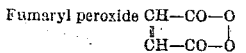
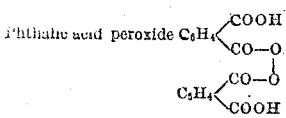

The peroxides have been prepared by treating the acid chlorides with sodium peroxide under suitable conditions.

As a specific example of my invention, the following is cited, it being understood that I do not limit myself to the specific proportions stated and the specific peroxide given is for illustrative purposes only as other peroxides may be used without departing from the spirit and scope of the invention.

To one hundred pounds of scrap are added fifty pounds of ethyl acetate in which three-quarters pound of a 60% phthalyl peroxide is dissolved. The mass is allowed to stand until the ethyl acetate is absorbed, the whole forming a soft plastic mass. This process distributes the peroxide through the mass of celluloid and the bleaching occurs gradually, being hastened somewhat by warming or the addition of a trace of alkali. Twenty-four hours standing in the cold is usually sufficient to complete the process; at 100° F. ten to fifteen minutes suffice. The mass is then milled on rolls, this and the subsequent operations being carried out just as in the original manufacture of the celluloid. The finished product is colorless to pale yellow and suitable for the manufacture of light colored transparent articles.

The amount of solvent, the type of solvent and the amount of peroxide are all subject to wide variation. The amount of peroxide will naturally vary with the kind and strength of the color to be removed. The process is not applicable where the color is due to mineral pigments such as lampblack but is generally applicable with organic coloring matters, particularly the oil-soluble dyes. Any peroxide of an organic acid can be used, provided the oxygen is loosely bound so as to exert bleaching action. The one to be selected depends on commercial availability and cost.

The process is applicable to ordinary celluloid, to plastics of the same type with a cellulose acetate base, to viscose, synthetic and natural resins, and, in general, products of the plastic type which have been colored with colors or dyes which color is capable of being discharged by oxidizing agents.

Having thus described my invention, I claim:

1. The removal of organic color from organic plastics comprising the addition of a peroxide of an organic acid.

2. The removal of organic color from organic plastics comprising the addition of phthalyl peroxide.

3. The improvement in the recovery of celluloid scrap containing organic color which comprises the addition of a peroxide of an organic acid to the scrap.

4. The improvement in the recovery of celluloid scrap containing organic color which comprises the addition of a peroxide of an organic acid dissolved in an organic solvent to the scrap.

5. The improvement in the recovery of celluloid scrap containing organic color which comprises the addition of phthalyl peroxide to the scrap.

6. The improvement in the recovery of celluloid scrap containing organic color which comprises the addition of phthalyl peroxide dissolved in ethyl acetate to the scrap.

7. The improvement in the recovery of celluloid scrap containing organic color which comprises the addition of a peroxide of an organic acid to a mixture of the scrap with a celluloid solvent.

8. The improvement in the recovery of celluloid scrap containing organic color which comprises the addition of phthalyl peroxide to a mixture of the scrap with a celluloid solvent.

9. The improvement in the recovery of celluloid scrap containing organic color which comprises the addition of phthalyl peroxide to a mixture of the scrap with ethyl acetate.

10. The improvement in the recovery of celluloid scrap containing organic color which comprises the addition of a peroxide of an organic acid to a mixture of the scrap with ethyl acetate.

11. The removal of organic color from organic plastics comprising the addition of an organic peroxide to a mixture of the plastic and a celluloid solvent.

12. The removal of organic color from organic plastics comprising the addition of phthalyl peroxide to a mixture of the plastic and a celluloid solvent.

In testimony whereof, I hereby affix my signature.

JOHN MORRIS WEISS.